Aug. 7, 1923.

P. LEO

VALVE ADJUSTING DEVICE

Filed April 12, 1920

1,464,082

Inventor
Paul Leo,
By Attorney
Geo. A. Byrne

Patented Aug. 7, 1923.

1,464,082

UNITED STATES PATENT OFFICE.

PAUL LEO, OF ELIZABETH, NEW JERSEY.

VALVE-ADJUSTING DEVICE.

Application filed April 12, 1920. Serial No. 373,071.

*To all whom it may concern:*

Be it known that I, PAUL LEO, a citizen of the United States, and resident of Elizabeth, in the county of Union and State of New Jersey, have invented certain new and useful Improvements in Valve-Adjusting Devices, of which the following is a specification.

This invention relates to valve operating connections for internal combustion engines and to means for adjusting the same.

The invention provides a construction which is simple and readily manufactured and which is capable of being applied to existing engines, by the simple substitution of a part of the valve operating connection such for example, as a part of the valve-rod or the rocker-arm.

The invention further provides a device which admits of making the adjustment of the parts to secure the proper setting thereof and proper operation of the valve, with much greater ease, with the exercise of much less skill, and with much greater accuracy and speed than heretofore.

The invention further provides a novel combination and sub-combinations, hereinafter more fully set forth, for accomplishing the purposes of the invention.

Several embodiments of the invention are illustrated in the accompanying drawing, wherein—

Figure 1:
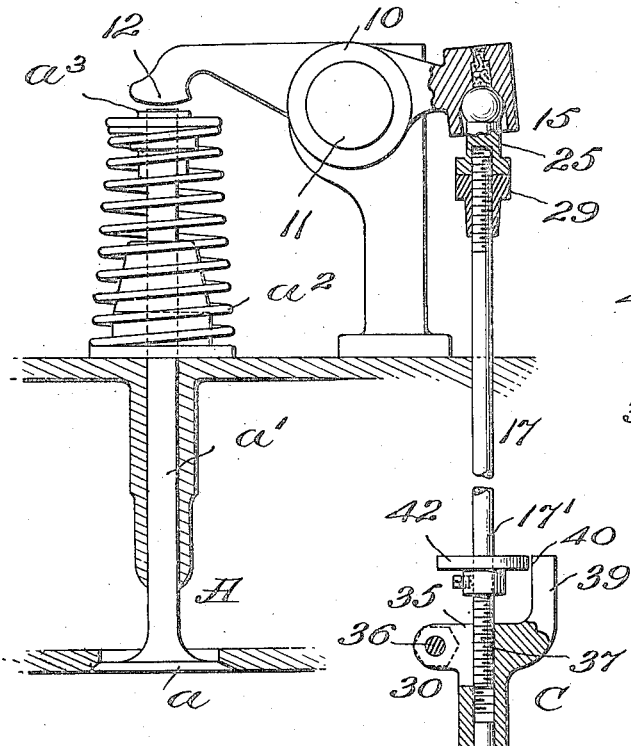
Figure 1 is a view, partly in elevation and partly in section, of a valve-operating connection, and a valve and cam-shaft, constituting parts of an internal combustion engine.

Referring to said drawings, A designates a valve, of the usual or any desired construction, comprising the valve proper $a$, stem $a'$, closing spring $a^2$, butt $a^3$. B designates a cam-shaft, having a cam $b$ thereon, and C designates as a whole the operating connection between the cam-shaft and valve.

The operating connections may comprise a rocker-arm 10, turning in bearings 11, and having at one end a shoe 12 adapted to contact with the end or butt $a^3$ of the valve stem $a'$ to open the valve $a$ against the tension of the closing spring $a^2$. The other end of the rocker-arm 10 is connected by means of a suitable joint, as for example a ball and socket joint 15, with a connecting rod 17. The connecting rod 17 conveniently has at its other end, a slide 19 working in a suitable guide sleeve 21 and preferably having at its end an antifriction roller 23 for bearing on the cam $b$. The connecting rod 17 ordinarily comprises a short piece 25 carrying the ball of the ball and socket connection 15, to which it is attached by a screw thread connection, the connection being made secure by means of a lock nut 29.

The adjustments for securing the proper timing and operation of the valve are ordinarily made by loosening the lock nut 29 and adjusting the connection of the rod to the ball piece 25, by means of the screw threads, and thereafter tightening the lock nut. This means of effecting the adjustment of the valve is however unsatisfactory, the work of making the adjustment being tedious and taking considerable time, owing to looseness or back-lash in the screw threads, which makes it a matter of chance and repeated trials to secure the proper adjustment.

According to the present invention, a micrometer gauge in the form of an adjustable joint 30 is provided in some part of the operating connection C, said joint being of a character which avoids loose movement, and there is also preferably provided in conjunction with said adjustable joint a means for accurately indicating the amount of adjustment which is or may be given to the parts.

Figure 2:
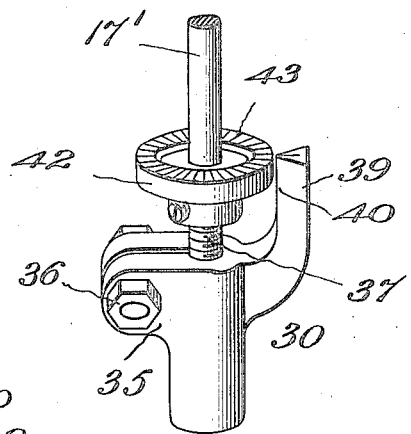
Figure 2 is a perspective view of the adjusting means applied to the valve-operating rod.
Figure 5:
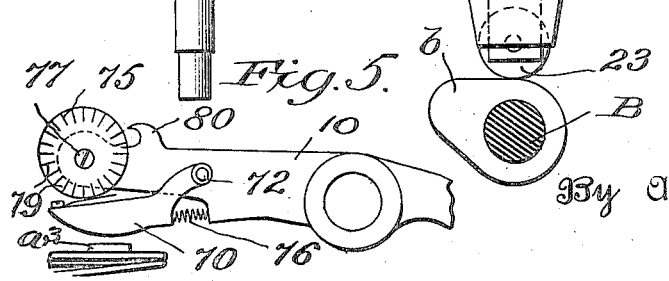
Figure 5 is a side view of an embodiment of the adjusting means applied to the rocker-arm of the valve-operating connection.
Figure 3:
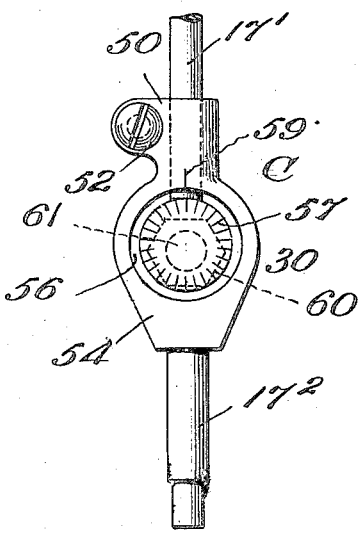

Three different embodiments of the adjustable joint 30 are illustrated in Figures 2, 3, and 5 respectively.

In Figures 1 and 2 the connecting rod 17 is shown as divided into the parts 17' and 17², and the adjustable joint 30 provided between these parts. The joint may be comprise a split nut 35, provided with a tightening screw or bolt 36, and threads 37 on the part 17' of the connecting rod. The part 17' may be made of a standard length, and the part 17² may be made in a variety of lengths so as to facilitate the fitting of the valve operating connections to engines of various sizes. The clamping screw 36 preferably acts at right angles to the direction of adjustment of the parts 17' and 35, and hence the tightening thereof does not act or tend to lengthen or shorten the rod.

The nut 35 may be provided with an upward projection 39, sharpened at one edge, as indicated at 40, and serving as a pointer, and is adapted to coact with a disk or collar 42 which may be fastened on the part 17' of the connecting rod, and which is provided with graduations 43. The disk or collar 42 may also serve the purpose of a hand-wheel for turning the rod 17'.

By the present device, valves may be adjusted in a moment with absolute accuracy to within one or two tenths of a thousandth of an inch, by putting the cylinder on "compression" or "explosion" (so that both valves are normally closed), loosening the tightening screw 36 of the split nut 35 until the rod 17' will just turn. The rod 17' is then turned until there is no clearance between the shoe 12 and the butt $a^3$ of the valve stem. The rod 17' is then turned backwardly to the extent required, (which is known or learned by use of the engine) and the extent of turning can be measured to thousandths of an inch or less by observing the number of graduations which pass the pointer during the turning of the rod. If the pitch of the threads between the split nut 35 and rod 17' be 1/28 of an inch, and the disk 42 be provided with 36 divisions, each graduation will indicate a movement of one thousandth of an inch. After the adjustment is made, the clamp screw 36 of the split nut 35 is tightened, and the parts are then secure.

In cases where the rocker arm 10 is not pivoted on its center and there is correspondingly a greater or less radius of motion, provision can easily be made by the use of a dial with a greater or less number of graduations to meet the needs of the particular case, or a correction chart may be furnished stating the number of degrees necessary to turn push rod for the particular model of car or engine upon which the devices are to be used.

It will be noted that tightening the tightening screw in my device does not tend to set the push rod nearer to the rocker arm nor further away from it, back lash is eliminated by the fact that it is only loosened sufficiently to allow of push rod 17' being revolved, making a perfect fit between both male and female threads.

It usually requires an hour and one half or two hours to properly adjust valves for clearance, by prior devices. Too much clearance makes an engine noisy, a very large clearance interferes with the proper operation of the engine and will cause it to lose power. Too little clearance will cause the valves to hold open when they should be seated on the compression and explosion strokes etc. and even prevent any operation whatever of the engine. A condition of slightly insufficient clearance will cause the valves to hold open when the engine is cold or not warmed to its proper operating temperature which usually approximates 180 degrees Fahrenheit preventing proper operation of the engine and great loss of power, accompanied by general back firing through the carburetor (a very dangerous fault) until it reaches the proper temperature. Little clearance also tends to warp the valve stems.

Obviously valves must be given just the proper clearance. Manufacturers almost invariably prescribe in the book of instructions accompanying each automobile manufactured by them what is the correct clearance to leave between rocker arm and valve stem. Some manufacurers even attach a metallic plate or tag to the engine stating the proper clearance to allow for the benefit of its users.

Generally speaking, exhaust valves must be given one or more thousandths of an inch clearance more than inlet valves, especially when their stems are long as exhaust valves almost invariably operate at a hotter temperature than inlet valves.

The usual method of adjusting valves with previous devices consists in placing the cylinder to be worked on, on compression or explosion cycle. Loosening the lock nut holding ball end of push rod and screwing the ball end up or down until a feeler gauge of thickness equalling the proper clearance can just be inserted between end of valve stem and rocker arm when the lock nut is tightened.

This operation requires considerable skill as the act of tightening the lock nut tends to alter the clearance, due to back lash between ball end and threads on push rod and several trials must be made before the correct adjustment is attained, two or three thousandths of an inch even making a considerable difference in the running of the engine.

In some cases no ball end is provided, the push rod fitting into a female thread in tappet and the other flat end of push rod striking one end of rocker arm. In this form of construction it is still, however, necessary to employ a lock nut to abut against the tappet and the back lash is a serious impediment to correct adjustment as in the case of push rods of the former constructions.

Figure 4:
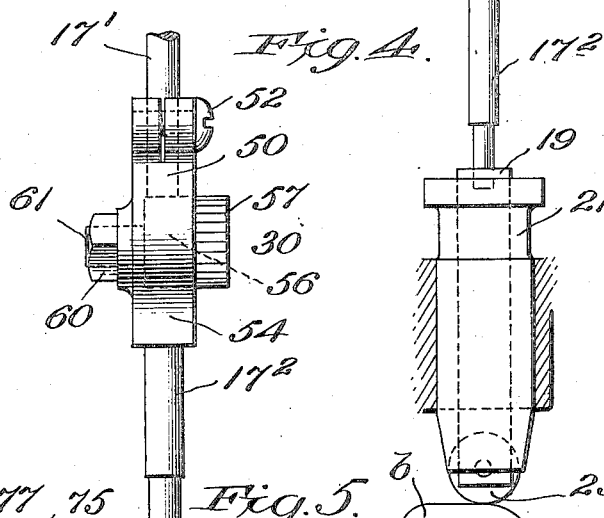
Figures 3 and 4 are respectively a front and side view of a second embodiment of the adjusting means applied to the valve-operating rod.

In the embodiment shown in Figures 3 and 4, the adjustable joint 30 comprises a split collar 50 in which the end of the rod 17' fits, and a clamping screw 52 serves for clamping the rod in said collar. Beneath the collar, and preferably formed as a part thereof is a block 54 having a recess 56 therein, in which recess is a cam 57. The end of the rod 17' fits against the side of said cam, and the face of the cam is preferably graduated in fractions corresponding to the rise of the cam. 59 designates a datum line on the block, with reference to which the graduations with cam are read, when the cam is moved. A nut 60 on a reduced shank 61 on the cam, extending through the block, serves for clamping the cam against the block, and binding it against movement.

The method of adjusting the valve operating connections is similar to that of adjusting the embodiment of Figures 1 and 2. The screw 52 is loosened sufficiently to permit a movement of the rod 17' therein. The cam 57 is turned until the shoe 12 presses against the butt $a^3$ of the valve-stem. The cam is then backed until it has been moved a number of graduations corresponding to the amount of clearance between the shoe 12 and the butt $a^3$. The rod 17' is then forced down into the cam, and the screw 52 tightened to clamp the rod. The cam 57 may be pressed into binding engagement with the block 54, by the nut 60, this preferably being done immediately after the cam is turned to the desired position of adjustment, so that it will not move during the moving of the rod during adjusting. The clamp screw 52 acts crosswise of the direction of adjustment of the parts 17' and $17^2$.

In the embodiment shown in Figure 5, the rocker-arm 10 is formed with an adjustable shoe 70, the shoe 70 conveniently being pivoted to the rocker arm, as shown at 72. A cam 75 is pivoted to the arm 10, and the shoe 70 adapted to bear against the side of said cam, said shoe being conveniently normally pressed against said cam by a spring 76. A screw 77 serves for a pivot for said cam, and also for binding it against the rocker-arm. The face of the cam 75 may be provided with graduations 79 proportional to the rise thereof, and a suitable pointer or indicator 80 may be provided in conjunction with the graduations. The embodiment of Figure 5 is of especial advantage where the rods 17 are enclosed in tubes, and where hence there would not be sufficient space in the tubes for adjusting means between parts of the rod. Moreover adjusting means in the rod would be difficult to reach in such a case.

The embodiment of Figure 5 is manipulated in a manner similar to those of the preceding embodiments. The shoe 70 is first pressed down by the cam 75 against the butt $a^3$ of the valve stem. The cam is then backed off to the required extent, and the screw 77 then tightened to clamp the cam against movement. The screw 77 acts in a direction at right angles to the direction of adjusting movement of the shoe 70.

The invention may receive other embodiments than those herein specifically illustrated and described.

What is claimed is:—

1. A valve operating connection comprising two parts adapted to be adjusted toward and from one another in the direction of the transmission of operative motion, one of the said parts provided with a series of graduations and the other of said parts provided with an indicator cooperating with said graduations for measuring the extent of movements of said parts.

2. A valve operating connection comprising two parts adapted to be adjusted toward and from one another in the direction of the transmission of operative motion and a micrometer gauge operatively connected with said valve operating connection, said gauge comprising a graduated disc and an indicator cooperating with the graduations on said disc for measuring the extent of movement of said valve parts.

3. A valve operating connection comprising two parts adapted to be adjusted toward and from one another in the direction of the transmission of operative motion, a micrometer gauge operatively connected with said valve operating connection, said gauge comprising a graduated disc; an indicator cooperating with the graduations on said disc for measuring the extent of movement of said valve parts and means for clamping the parts against relative movement.

4. A valve operating connection comprising two parts adjustable toward and from one another in the direction of the transmission of operative motion, one of said parts provided with a series of graduations and the other of said parts provided with an indicator cooperating with said graduations for measuring the extent of movements of said parts and means for clamping the parts against relative movement.

5. A valve operating connection comprising two parts adjustable toward and from one another in the direction of the transmission of operative motion, one of said parts provided with a series of graduations and the other of said parts provided with an indicator cooperating with said graduations for measuring the extent of movements of said parts and a split nut for clamping the parts against relative movement.

6. A valve operating connection comprising two parts and a micrometer gauge for obtaining adjustments of parts toward and from one another in the direction of the transmission of operative motion, said gauge comprising a graduated disc mounted on one of the parts, an indicator mounted on the other of the parts and cooperating with the graduations on the disc and means for clamping the parts against relative movement.

7. A valve operating connection comprising two parts and a micrometer gauge for obtaining adjustments of parts toward and from one another in the direction of the transmission of operative motion, said gauge comprising a graduated disc mounted on one of the parts, an indicator mounted on the other of the parts and cooperating with the graduations on the disc and a split nut for clamping the parts against relative movement.

Signed at New York, in the county of New York and State of New York, this fifth day of April, A. D. 1920.

PAUL LEO.